(12) United States Patent
Marzorati et al.

(10) Patent No.: US 12,337,545 B2
(45) Date of Patent: Jun. 24, 2025

(54) THREE-DIMENSIONAL PRINTING USING CONFIGURABLE MOVEMENT TRACKS

(71) Applicant: International Business Machines Corporation, Armonk, NY (US)

(72) Inventors: Mauro Marzorati, Lutz, FL (US); Jeremy R. Fox, Georgetown, TX (US); Randy A. Rendahl, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 18/066,584

(22) Filed: Dec. 15, 2022

(65) Prior Publication Data

US 2024/0198598 A1    Jun. 20, 2024

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/393; B29C 64/209; B29C 64/106; B29C 64/227; B29C 64/386;
(Continued)

(56) References Cited

U.S. PATENT DOCUMENTS

| 8,525,124 B2 * | 9/2013 | Atwood | G01N 35/00 356/241.6 |
| 10,611,098 B2 | 4/2020 | Stolyarov et al. | |

(Continued)

FOREIGN PATENT DOCUMENTS

| CN | 105499573 A | 4/2016 |
| CN | 108127916 A | 6/2018 |

(Continued)

OTHER PUBLICATIONS

Pettersen, Kristin Y. "Snake robots." Annual Reviews in Control 44 (2017): 19-44. (Year: 2017).*

(Continued)

*Primary Examiner* — Galen H Hauth
*Assistant Examiner* — Ariella Machness
(74) *Attorney, Agent, or Firm* — Cantor Colburn LLP; Kristofer Haggerty

(57) ABSTRACT

Embodiments of the invention are directed to a computer-implemented method that includes receiving, using a processor, data representing a 3D physical object by a processing device, and controlling, using the processor, a 3D printing device to apply successive layers of a material by a printing head including a nozzle. The controlling includes depositing at least one layer by instructing a snake robot of a configurable track system to form a shape and define a movement track that corresponds to a movement profile aligned with the 3D model, moving the printing head along the movement track defined by the snake robot, and depositing the at least one layer via the nozzle as the printing head is moved along the movement track.

8 Claims, 4 Drawing Sheets

(51) Int. Cl.
  *B33Y 10/00* (2015.01)
  *B33Y 30/00* (2015.01)
  *B33Y 50/02* (2015.01)
(58) Field of Classification Search
  CPC ....... B29C 64/379; B33Y 10/00; B33Y 30/00; B33Y 50/00; B33Y 50/02
  USPC ........................................................ 264/40.1
  See application file for complete search history.

(56) References Cited

U.S. PATENT DOCUMENTS

| | | | | |
|---|---|---|---|---|
| 10,751,872 | B2* | 8/2020 | Pettersen | ................. B25J 9/065 |
| 10,759,113 | B2 | 9/2020 | Tyler et al. | |
| 11,034,026 | B2* | 6/2021 | Tan | ............................ B25J 9/06 |
| 11,504,854 | B2* | 11/2022 | Marvi | .................... B25J 9/1694 |
| 2017/0106601 | A1 | 4/2017 | Page | |
| 2018/0065299 | A1* | 3/2018 | Tyler | ....................... B33Y 50/02 |
| 2019/0091929 | A1 | 3/2019 | Harrison et al. | |
| 2019/0105773 | A1* | 4/2019 | Huang | ................. G05D 1/0274 |
| 2020/0316789 | A1 | 10/2020 | Sohmshetty et al. | |
| 2022/0219316 | A1 | 7/2022 | Sakuramoto et al. | |

FOREIGN PATENT DOCUMENTS

| | | |
|---|---|---|
| CN | 110355756 A | 10/2019 |
| CN | 110639738 A | 1/2020 |
| CN | 112847841 A | 5/2021 |
| WO | 2017080646 A1 | 5/2017 |

OTHER PUBLICATIONS

International Search Report; International Application No. PCT/EP2023/082613; International Filing Date: Nov. 21, 2023; Date of mailing: Feb. 6, 2024; 14 pages.

Srivastava et al. "3d printing of concrete with a continuum robot hose using variable curvature kinematics." International Conference on Robotics and Automation (ICRA). IEEE, (2022): 6 pages.

* cited by examiner

THREE-DIMENSIONAL PRINTING USING CONFIGURABLE MOVEMENT TRACKS

BACKGROUND

The present invention relates in general to programmable computers that control manufacturing equipment. More specifically, the present invention relates to systems and methods for three-dimensional (3D) printing using configurable movement tracks.

3D printing technology, also known as additive manufacturing, refers to a machine that fabricates a 3D physical object by using a printhead to successively form or deposit layers of material, typically using a 3D electronic model of the physical object. The 3D electronic model logically slices the physical object into several layers and provides instructions to a 3D printing machine to deposit each layer successively on a print base until the physical object is completed. The physical objects fabricated through 3D printing processes can have a variety of shapes and geometries.

SUMMARY

Embodiments of the invention are directed to a computer-implemented method that includes receiving, using a processor, data representing a 3D physical object by a processing device, and controlling, using the processor, a 3D printing device to apply successive layers of a material by a printing head including a nozzle. The controlling includes depositing at least one layer by instructing a snake robot of a configurable track system to form a shape and define a movement track that corresponds to a movement profile aligned with the 3D model, moving the printing head along the movement track defined by the snake robot, and depositing the at least one layer via the nozzle as the printing head is moved along the movement track.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
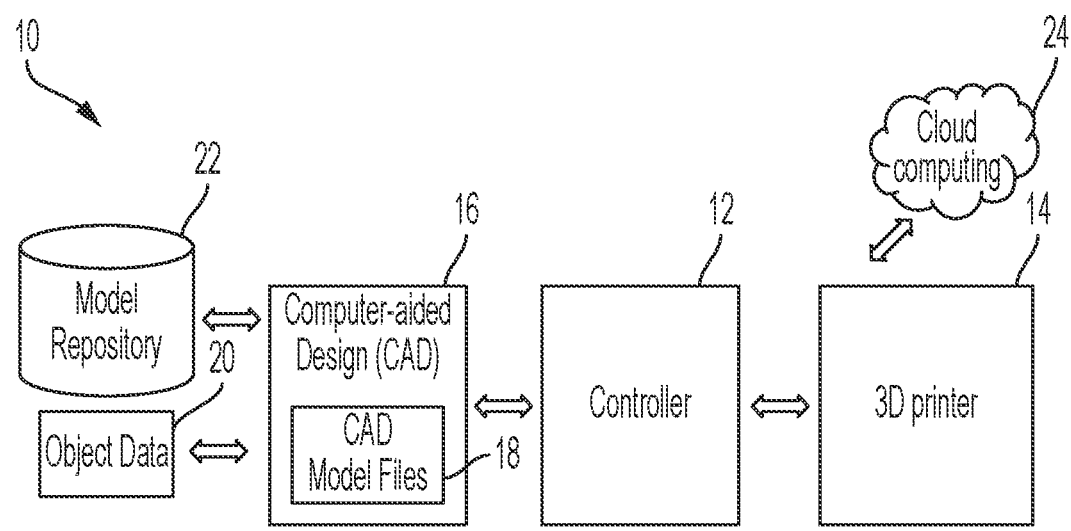
FIG. 1 depicts a simplified block diagram illustrating an additive manufacturing system in accordance with embodiments of the invention.

In the accompanying figures and following detailed description of the disclosed embodiments, the various elements illustrated in the figures are provided with three-digit reference numbers. In some instances, the leftmost digits of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of aspects of the invention, embodiments of the invention provide computing systems, computer-implemented methods, and computer program products for additive manufacturing. Embodiments of an additive manufacturing system in accordance with aspects of the invention include a three-dimensional printing device or system (3D printer) including components for providing variable movement tracks used to guide a printing head or other depositing device along desired movement profiles. A movement profile can be determined from a 3D model of a new object to be printed, or data representing modifications or additions to an existing object.

In embodiments of the invention, the 3D printer includes a variable movement track system that utilizes one or more snake robots to establish movement track according to desired movement profiles. For example, a snake robot can be instructed to assume a shape corresponding to the desired movement profile. In some cases, multiple snake robots can be instructed to connect to one another and define the movement profile.

Embodiments of the invention also include methods for additive manufacturing, which include depositing at least one layer of material using one or more snake robots to define a movement track during printing. The methods can include analyzing data related to a 3D model of a new object (or model representing an augmentation or modification to an existing object) and determining whether one or more layers are to be deposited using a variable movement track. The methods can also include dynamically adapting an established movement track (e.g., by controlling segments of a snake robot) in response to detection of defects.

Embodiments of the invention described herein present numerous technical benefits and effects. For example, with current or traditional 3D printers, a printing nozzle can be connected to a track to facilitate controlled movement and printing. This track provides physical support to the printing nozzle and can perform printing. In some scenarios, 3D printing involves the need or desire to print in a complex profile, which may not be sufficiently achievable using a fixed or rigid track. The embodiments of the invention described herein address this limitation by providing for on demand creation of a track that is customized for printing along a complex profile. The embodiments of the invention have advantages in numerous contexts, including large object printing, and modifications to existing objects via 3D printing.

FIG. 1 depicts a simplified block diagram illustrating a system 10 for additive manufacturing according to embodiments of the invention. The system 10 includes a controller 12 connected to a 3D printer 14 and configured to control the 3D printer 14 to build an object. The controller 12 can be connected to a design system 16 (e.g., a CAD system) that is used to generate one or more 3D models 18 used by the controller 12 to build the object. The design system 16 can be connected to various sources of information, such as a device 20 storing object data and/or a model component repository 22. The 3D printer can include a single printing head (as shown in the example of FIG. 2) or include multiple printing heads.

In addition, the controller 12 and/or other components of the system 10 can be part of or connected to a cloud computing network 24. The cloud computing network 24 is in wired or wireless electronic communication with the system 10, and can supplement, support or replace some or all of the functionality of the various components of the system 10. Additionally, some or all of the functionality of the system 10 can be implemented as a node of the cloud computing network 24. Additional details of cloud computing features of embodiments of the invention are depicted by a computing environment 100 shown in FIG. 6 and described in greater detail subsequently herein.

Figure 2:
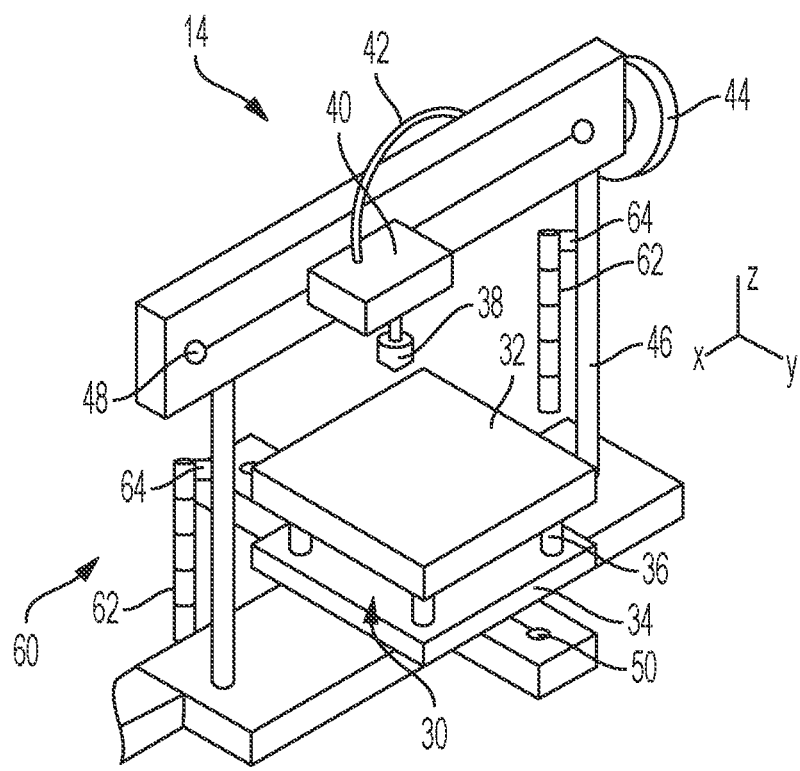
FIG. 2 depicts a three-dimensional (3D) printing device, including a fixed track system and a variable movement track system, in accordance with embodiments of the invention.

FIG. 2 depicts the 3D printer 14 according to an embodiment of the invention. The 3D printer fabricates creating of objects (or changes to existing objects) using one or more of various printing techniques. The 3D printer of FIG. 2 is described as being configured to use a material extrusion technique such as fused filament fabrication (FFF). Using such techniques, a continuous filament of a thermoplastic or a metal material is fed to a nozzle for deposition onto a printing bed, panel or other surface. The filament is heated to its melting temperature and layers of the material are deposited on the surface by extruding the melted material.

It is noted that the 3D printer 14 is not limited to FFF, and can use any suitable process. Examples of other processes include material jetting, powder bed fusion, and other types of material extrusion processes.

As shown in FIG. 2, the 3D printer 14 includes a moveable printing bed 30 that includes a panel 32 that is moveable vertically (in the z-direction) relative to a base 34 via one or more linear actuators 36 or other devices. The 3D printer 14 includes a nozzle 38 that is attached to a printing head 40 configured to feed a filament 42 from a spool 44. Although not shown, additional materials can be used to impart desired properties to an object. For example, a carbon fiber filament or other strengthening material is fed through the printing head 40 and infused into the filament 42 material during heating.

The printing head 40 and the nozzle 38 are moveable using a fixed track system having one or more fixed tracks. For example, a first track 48 is supported by support structures 46 and is controllable to move the printing head 40 along a first horizontal direction (x-direction). A second track 50 is configured to move the printing head 40 relative to the printing bed 30 along a second horizontal direction (y-direction).

The 3D printer 14 also includes a variable movement track system 60 that utilizes one or more snake robots 62 for defining variable or configurable movement tracks. The variable movement tracks provide guides to direct the printing head 40 and the nozzle 38 along a desired movement path or movement profile, by instructing one or more of the snake robots 62 to move to a position and assume a shape that corresponds to the desired movement profile. The snake robots 62 can be instructed to form a wide variety of shapes due to their limbless thin body structure and high flexibility. In addition, as discussed further below, a movement track can be defined by a single snake robot 62, or multiple snake robots 62 working in concert.

Each snake robot 62 is disposed at a resting location when not in use. For example, as shown in FIG. 2, each snake robot 62 is attached (or removably connected) to an anchor point 64 on a respective support structure 46. Embodiments of the invention are not so limited, as the snake robots 62 can be stored or disposed at any suitable location, either within the 3D printer 14 or external to the 3D printer 14.

It is noted that multiple types of snake robots can be stored at the 3D printer for use. For example, there may be snake robots having multiple lengths, multiple sizes (e.g., diameters) and different modes of movement (e.g., inchworming vs sidewinding).

In addition, one or more snake robots 62 can be disposed on moveable bases. In an embodiment of the invention, the 3D printer and/or other components of the system 10 (e.g., the controller 12) include mobile elements that allowing snake robot printing to be applied in the field for repairs and enhancements in place. The track framework or attachment points may be portable, potentially robotic in nature along with a printing system to support it. An additive manufacturing method may include performing a 3D scan to identify both an object to print on and various movement profiles as part of a printing plan.

In use, when a snake robot 62 is activated, the snake robot 62 can move while remaining connected to an anchor point 64, or detach from the anchor point 64 and move to a desired position under its own locomotive power (e.g., by slithering, sidewinding, rolling, etc.).

Figure 3:
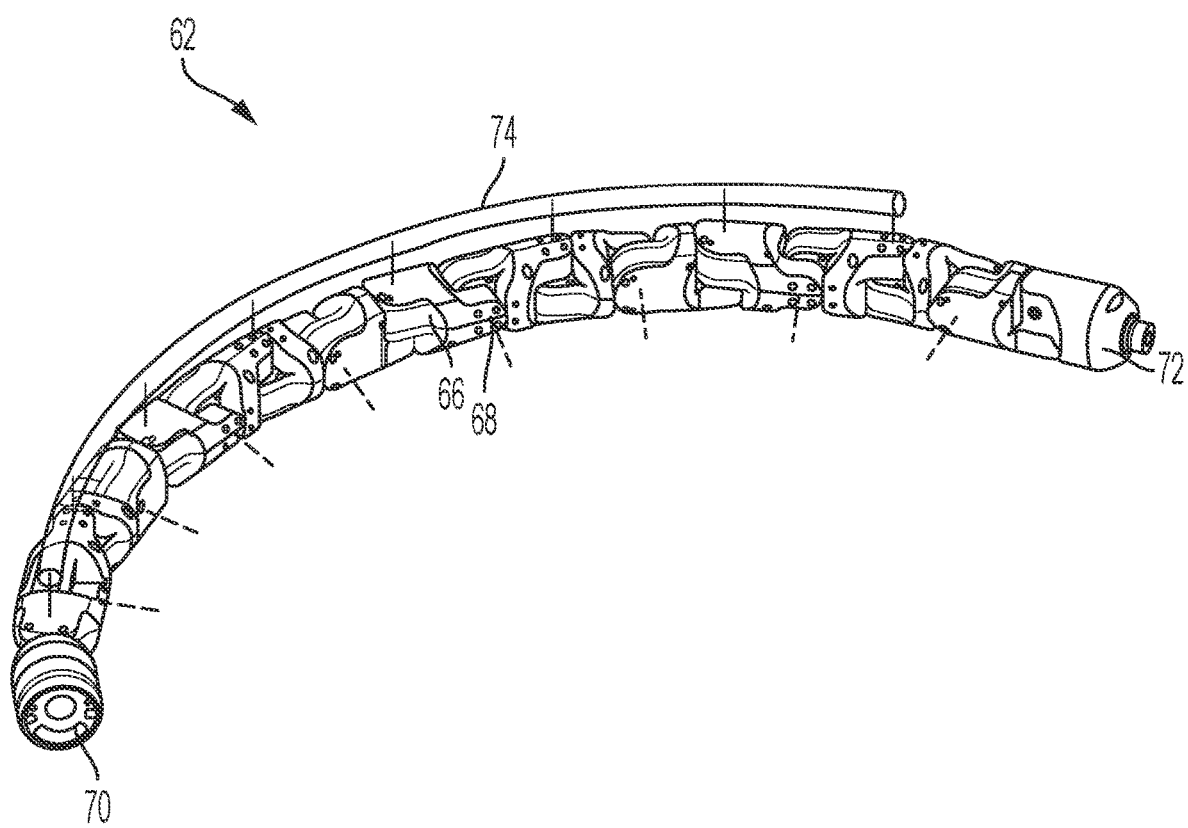
FIG. 3 depicts a snake robot of the variable movement track system of FIG. 2, in accordance with embodiments of the invention.

FIG. 3 depicts an example of a snake robot 62 and illustrates features that facilitate the creation of movement tracks and printing along such tracks. In this example, the snake robot 62 is a modular robot that includes a plurality of individually controllable segments 66, in which each segment 66 includes a servo motor and a joint section 68 that permits relative movement between adjacent segments 66. In addition, the snake robot 62 includes one or more connection mechanisms, such as a female connector 70 and a make connector 72. The connectors may be used to connect multiple snake robots together and/or to connect to the anchor point 64 or other base structure.

The snake robot 62 may also include features that facilitate movement, positioning and shape creation, such as cameras and/or other sensors. Other features may include segments or components that are variable in translucency, to permit optical indicators to be used (e.g., to indicate printing speed and/or material required for a section of an object).

Further features may include one or more printing heads disposed on, or internal to, the snake robot body. For example, side-by-side printing heads internal to the snake robot body can be used to apply several rows or layers of material on the same surface by moving a printing head left and right within the snake robot track path.

In an embodiment of the invention, the snake robot 62 includes one or more physical features that facilitate guiding a printing head and/or nozzle. For example, the snake robot 62 includes an elongated physical track 74 that extends along the body of the snake robot 62. The physical track 74 may be a cylindrical body as shown or any other suitable shape and size. The physical track 74 may be configured to allow a portion of a nozzle or printing head to contact or sit on the track 74 during movement. The track 74 may include features (e.g., a hook, clamp or other mechanism) that hold the nozzle and printing head at or near the track 74 during movement.

Figure 4:
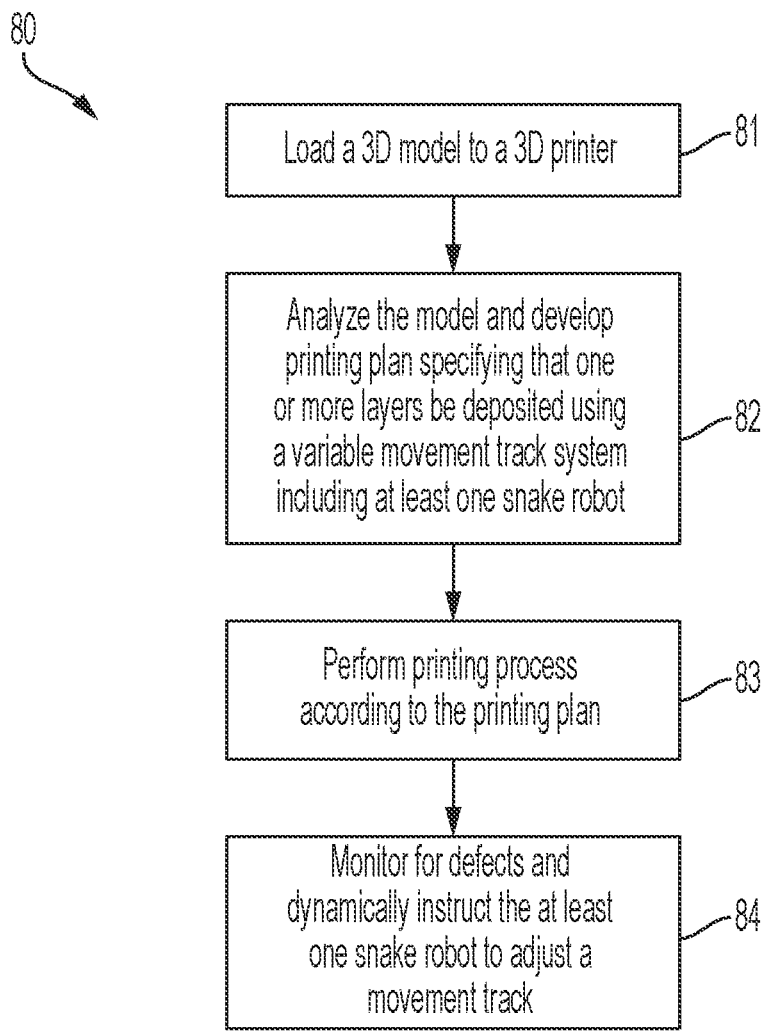
FIG. 4 depicts a flow diagram illustrating a computer-implemented or computer-controlled method in accordance with embodiments of the invention.

FIG. 4 depicts a flowchart of a method 80 of additive manufacturing according to an embodiment of the invention. The method 80 includes a number of steps or stages represented by blocks 81-84. It is noted that the method may include all of the steps or stages or fewer than all of the steps or stages.

The method 80 may be performed by any suitable computing device or system. For example, the method can be performed by the computer 101, the processor set 110 and/or the end user device 103.

The method 80 is discussed in conjunction with the controller 12 of FIG. 1 and the 3D printer 14 of FIG. 2 for illustration purposes. However, the method is not so limited, as the method 80 can be used with any suitable 3D printing device.

At block 81, the controller 12 loads a 3D model (or other data representing an object from the design system 16. For example, a computer-aided manufacturing (CAM) software package is used to generate a model. The model can correspond to a new object, or correspond to a portion of an existing object, an addition to an existing object or a correction to an existing object (e.g., for corrective printing or object augmentation).

In an embodiment of the invention, the 3D printer 14 includes at least two movement systems. A first system is a fixed movement track system that uses fixed tracks 48 and 50 that move the printing head 40 and the nozzle 38 along a desired movement profile in three-dimensions. A second system is a variable movement track system that utilizes at least one snake robot 62 to define a movement profile.

At block 82, the controller 12 analyzes the model to determine various movement profiles that the printing head 40 and the nozzle 38 should follow when depositing various layers. The controller 12 can also analyze the model to determine whether each layer can be deposited using the fixed track system, and/or identify one or more layers that are to be deposited using the variable track system. Such layers can be layers that have a contour that is too complex or otherwise cannot be effectively handled using the fixed track system. A printing plan may be developed, which includes prescriptions as to when to employ the variable movement track system (e.g., which layers or components), and instructions as to the location and shape that a snake robot 62 should take for a given movement profile (and number of robots if multiple snake robots 62 connect to define a movement track).

The 3D model may be provided for printing a new object, or for printing on an existing object in order to augment an existing object. Augmentation may include adding material or new features to the object, removing material from the object, changing surface textures or any other change to the existing object.

In an embodiment of the invention, if the additive manufacturing method 80 is for augmentation, developing the printing plan includes one or more of the following operations. A first operation includes mapping the existing object with location waypoints. For example, the controller 12 or other device controls a scanner to perform a 3D scan of the existing object to determine the exact location of the object, the object orientation and waypoints for movement profiles. The position of waypoints and the location of the object are defined relative to fixed reference points on a support framework or connection points. Other operations include analyzing each area that requires augmentation via 3D printing, including determining the surface contour the printing will be applied to.

A further operation includes determining the length of the movement profiles and selecting an appropriate snake robot or set of snake robots to provide sufficient length and flexibility for a given movement profile. In the case where the movement profile is too complex or varied, the printing plan may break up a movement profile into segments that can be tracked.

Other operations include selection of filament type and nozzle. The selected nozzle and filament type is used for a stability management operation, in which the weight of materials and the nozzle are taken into account to select an appropriate snake robot configuration. For example, the number of snakes selected may be based on a need for additional strength to assure stability for printing segment(s). 3D scanning or structural variance calculations may be used to adjust the predicted snake positioning against the required due to stress changes to the framework or connection points due to the snake print system weight.

In systems with multiple print nozzles and sufficient number of snake robots, some or all of the above operation may be applied in parallel to achieve more printed elements in a given time.

At block 83, the printing process commences, during which the controller 12 controls movement of the printing head 40 and the print nozzle 38 according to the printing plan. Typically, if the object is a new object, an initial layer is deposited on the print bed, and subsequent layers are deposited thereon to build the object. If the object is an existing object, layers are deposited on surfaces of the existing object.

When the printing plan indicates that a layer is to be deposited using a variable movement track, one or more snake robots 62 are selected (e.g., a number and type of snake robot(s) as prescribed by the printing plan) and instructed to move from their bases or anchor points and position themselves along a desired movement profile. The snake robot or robots define a shape that aligns with the movement profile.

A layer is then deposited while a printing head and nozzle are moved along the body of the snake robot or robots. The printing head may be guided by a physical structure, such as the body of the snake robot 62 or a guide structure such as the physical track 74 of FIG. 3. As each layer is applied, the snake robot track will adjust to allow the next layer to apply In an embodiment of the invention, neither the printing head 40 nor the nozzle 38 contact the snake robot 62 or are guided directly, but are rather guided indirectly. For example, laser range finding, optical observation (e.g., using a camera and image processing) or other monitoring is used to guide the print head and nozzle along a virtual path that corresponds to the movement track defined by the snake robot 62. In this embodiment of the invention, snake robots can be positioned outside of the volume of the printing chamber.

At block 84, during deposition of each layer, the controller 12 (using, e.g., a laser scanner) inspects the object, may compare the object with the 3D model, and determines whether there are any defects in the printing process. If a defect is identified, the controller 12 dynamically instructs the snake robot(s) 62 to adapt the shape and movement profile to correct the defect.

Figure 5:
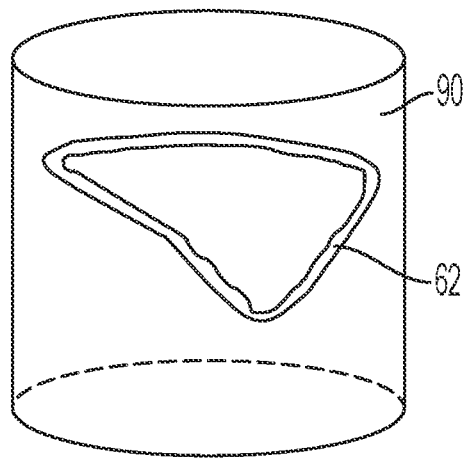
FIG. 5 depicts an example of a variable movement track.

FIG. 5 depicts an example of a movement track defined by the snake robot. In this example, the object is a large scale object 90 (e.g., a water tank). The model indicates that an inner surface of the object 90 is to be modified by adding material or changing a surface feature along a selected profile. As shown, the snake robot 62 (or multiple robots connected together) defines a shape that corresponds to the movement profile along the inner surface of the object. Although not shown, the snake robot 62 may be supported by an anchor or other mechanism.

In this example, the shape defines a closed loop path for the printing nozzle to follow. In other examples, the shape is an open loop shape.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
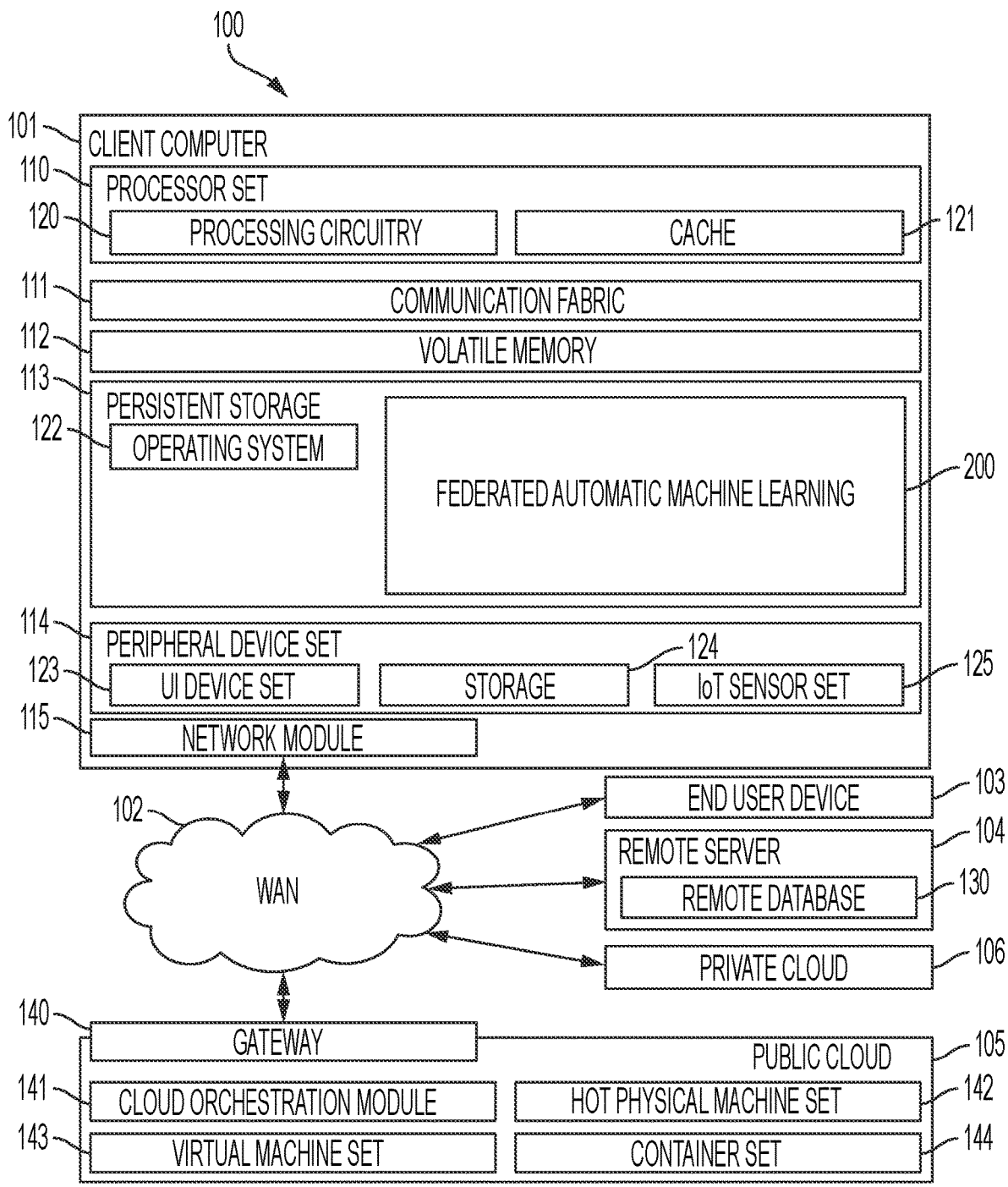
FIG. 6 depicts details of an exemplary computing environment operable to implement embodiments of the invention.

Referring now to FIG. 6, computing environment 100 contains an example of an environment for the execution of at least some of the computer code involved in performing the inventive methods, such as federated automatic machine learning 200 (referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, using a processor, data representing a 3D physical object by a processing device; and
controlling, using the processor, a 3D printing device to apply successive layers of a material by a printing head including a nozzle, wherein the controlling includes depositing at least one layer by:
instructing a snake robot of a configurable track system to form a shape and define a movement track that corresponds to a movement profile aligned with a 3D model of the 3D physical object, moving the printing head along the movement track defined by the snake robot, and depositing the at least one layer via the nozzle as the printing head is moved along the movement track.

2. The computer-implemented method of claim 1, wherein the snake robot includes a plurality of snake robots, and depositing the at least one layer includes coupling at least two of the plurality of snake robots to define the shape and the movement track.

3. The computer-implemented method of claim 2, wherein the shape defines a closed loop path for movement of the printing head.

4. The computer-implemented method of claim 1, wherein the 3D printing device includes a fixed track system in addition to the configurable track system.

5. The computer-implemented method of claim 4, further comprising analyzing the data prior to printing to identify at least one layer that is to be deposited using the configurable track system.

6. The computer-implemented method of claim 5, wherein the 3D physical object is an existing object, the data represents an augmentation to the existing object, and analyzing the data includes scanning the existing object to select location waypoints defining the movement profile.

7. The computer-implemented method of claim 4, wherein depositing the at least one layer is based on determining that the at least one layer cannot be deposited using the printing head in conjunction with the fixed track system.

8. The computer-implemented method of claim 1, wherein moving the printing head includes one of:
   physically coupling the printing head to a physical track on the snake robot and moving the printing head along the physical track;
   tracking the shape of the snake robot and moving the printing head along a virtual path corresponding to the shape.

\* \* \* \* \*